(12) United States Patent
Rutter et al.

(10) Patent No.: US 7,262,581 B2
(45) Date of Patent: Aug. 28, 2007

(54) POWER SUPPLY

(75) Inventors: Nicholas Alexander Rutter, Coventry (GB); Stuart Hart, Coventry (GB)

(73) Assignee: Fireangel Limited, Coventry (GB)

( * ) Notice: Subject to any disclaimer, the term of this patent is extended or adjusted under 35 U.S.C. 154(b) by 0 days.

(21) Appl. No.: 10/476,963

(22) PCT Filed: May 7, 2002

(86) PCT No.: PCT/GB02/02090

§ 371 (c)(1),
(2), (4) Date: Apr. 23, 2004

(87) PCT Pub. No.: WO02/091542

PCT Pub. Date: Nov. 14, 2002

(65) Prior Publication Data

US 2004/0169496 A1    Sep. 2, 2004

(30) Foreign Application Priority Data

May 5, 2001    (GB) .................................. 0111107.9

(51) Int. Cl.
H01M 10/44    (2006.01)
H01M 10/46    (2006.01)
(52) U.S. Cl. ........................ 320/134; 320/136
(58) Field of Classification Search ............... 320/136, 320/134, 128; 361/90, 56
See application file for complete search history.

(56) References Cited

U.S. PATENT DOCUMENTS

| | | | | |
|---|---|---|---|---|
| 3,816,805 A * | 6/1974 | Terry | ........................... | 320/123 |
| 3,886,426 A * | 5/1975 | Daggett | ....................... | 320/117 |
| 4,274,044 A * | 6/1981 | Barre | ........................... | 320/102 |
| 4,719,401 A | 1/1988 | Altmejd | | |
| 5,164,874 A * | 11/1992 | Okano et al. | .................. | 361/56 |
| 5,332,927 A * | 7/1994 | Paul et al. | ..................... | 307/66 |
| 5,519,563 A * | 5/1996 | Higashijima et al. | ......... | 361/16 |
| 5,617,010 A * | 4/1997 | Higashijima et al. | ....... | 320/134 |
| 5,635,821 A * | 6/1997 | Smith | ......................... | 320/103 |
| 6,049,144 A * | 4/2000 | Frannhagen et al. | ........ | 307/130 |
| 6,172,482 B1 * | 1/2001 | Eguchi | ....................... | 320/134 |

(Continued)

FOREIGN PATENT DOCUMENTS

JP    11-225450    8/1999

(Continued)

OTHER PUBLICATIONS

International Search Report of PCT/GB02/02090, dated Aug. 26, 2002.

(Continued)

*Primary Examiner*—Edward H. Tso
(74) *Attorney, Agent, or Firm*—Christie, Parker & Hale, LLP

(57) ABSTRACT

A rechargeable power supply including voltage protection means through voltage dependent disconnecting means. A rechargeable power supply comprises at least one rechargeable cell connectable to a power source, a Zener diode connected to the at least one cell, and a bipolar transistor or a FET for selectively disconnecting the Zener diode from the cell in order to reduce any discharge of the cell through the voltage protection means. The Zener diode and the transistor are connected together in series and jointly connected across the cell in parallel.

15 Claims, 3 Drawing Sheets

U.S. PATENT DOCUMENTS 6,331,764 B1    12/2001  Oglesbee et al.
6,608,470 B1 *   8/2003  Oglesbee et al. ........... 320/136
6,710,995 B2 *   3/2004  Knoedgen ................... 361/104
6,791,809 B2 *   9/2004  Pannwitz ..................... 361/90

FOREIGN PATENT DOCUMENTS

| JP | 11 225450 | 8/1999 |
| WO | WO99/39400 | 8/1999 |
| WO | WO99 39400 | 8/1999 |

OTHER PUBLICATIONS

Patent Abstract of Japan, Publication No. 11-225450, Published on Aug. 17, 1999, in the name of Kurebayashi, et al.

Patent Abstracts of Japan, Publication No. 11225450; Publication Date Aug. 17, 1999; Applicant: Tanaka Minoru.

\* cited by examiner

POWER SUPPLY

CROSS-REFERENCE TO RELATED APPLICATION

This application is a National Phase Patent Application of International Application Number PCT/GB02/02090, filed on May 7, 2002, which claims priority of British Patent Application Number 0111107.9, filed on May 5, 2001.

FIELD OF THE INVENTION

The present invention relates to a power supply and particularly, but not exclusively, to a rechargeable power supply for powering electronic equipment.

BACKGROUND OF THE INVENTION

Rechargeable power supplies generally consist of a number of rechargeable batteries or cells arranged in series, in parallel or in a series/parallel combination. It is common to provide Zener diodes connected in parallel across each cell to prevent the recharging voltage supplied to the cell from exceeding a predetermined level, which could result in damage to the cell, and to allow the power supply to continue to supply power to any connected equipment in the event of one or more of the cells failing in an open circuit condition.

In such an arrangement, the Zener diodes act as voltage regulators whereby if the voltage applied to the cell exceeds a certain level, break down of the Zener diode will occur causing current to leak through the Zener diode in the reverse direction. As the applied voltage increases the current leaking through the Zener diode also increases. This has the effect of clamping the voltage over the cell to a predetermined level.

To ensure that the cell is not subjected to a voltage higher than its maximum rating, the Zener diode used must be capable of leaking a reverse current which is at least equal to the charging current of the power supply at a voltage which is less than or equal to the cell's maximum voltage rating. However, Zener diodes generally do not have a stepped on-off break down characteristic and thus permit leakage current through the diode, to greater or lesser extent, over a range of voltages. Thus, a Zener diode having a 2.5 mA leakage current at a breakover voltage of 3.3 V may still permit 50% of that current to pass through at an applied reverse-biased voltage of 3.2 volts. Consequently, once the power supply is fully charged and the charging current removed, the leakage current through the Zener diodes will continue until the voltage over the cell has been reduced to a point where the Zener diode has zero leakage current. During this time, the leakage current through the Zener diode will cause discharging of the cell.

Since rechargeable cells are effective for only a limited number of charge/discharge cycles, this number usually being a function of the percentage depth of each cycle, the discharge effect of the Zener diode on the cell means that the potential life of the cell, and therefore power supply as a whole, is significantly reduced, both in terms of each charge/discharge cycle and the overall life of the power supply. This is a particular problem in low power applications (for example smoke detectors/alarms), where the leakage current through the Zener diodes is often a high multiple of the supply current required to power the equipment. This has the effect of reducing the life of the rechargeable power supply to a fraction of its potential life.

SUMMARY OF THE INVENTION

The present invention seeks to provide an improved power supply.

Accordingly, the present invention provides a rechargeable power supply comprising:
a rechargeable cell connectable to a power source;
voltage protection means connected to said cell; and
disconnecting means for selectively disconnecting said voltage protection means from said cell thereby to reduce any discharge of said cell through said voltage protection means.

BRIEF DESCRIPTION OF THE DRAWINGS

The present invention will now be described, by way of example only, with reference to the accompanying drawings in which.

DETAILED DESCRIPTION

Figure 1:
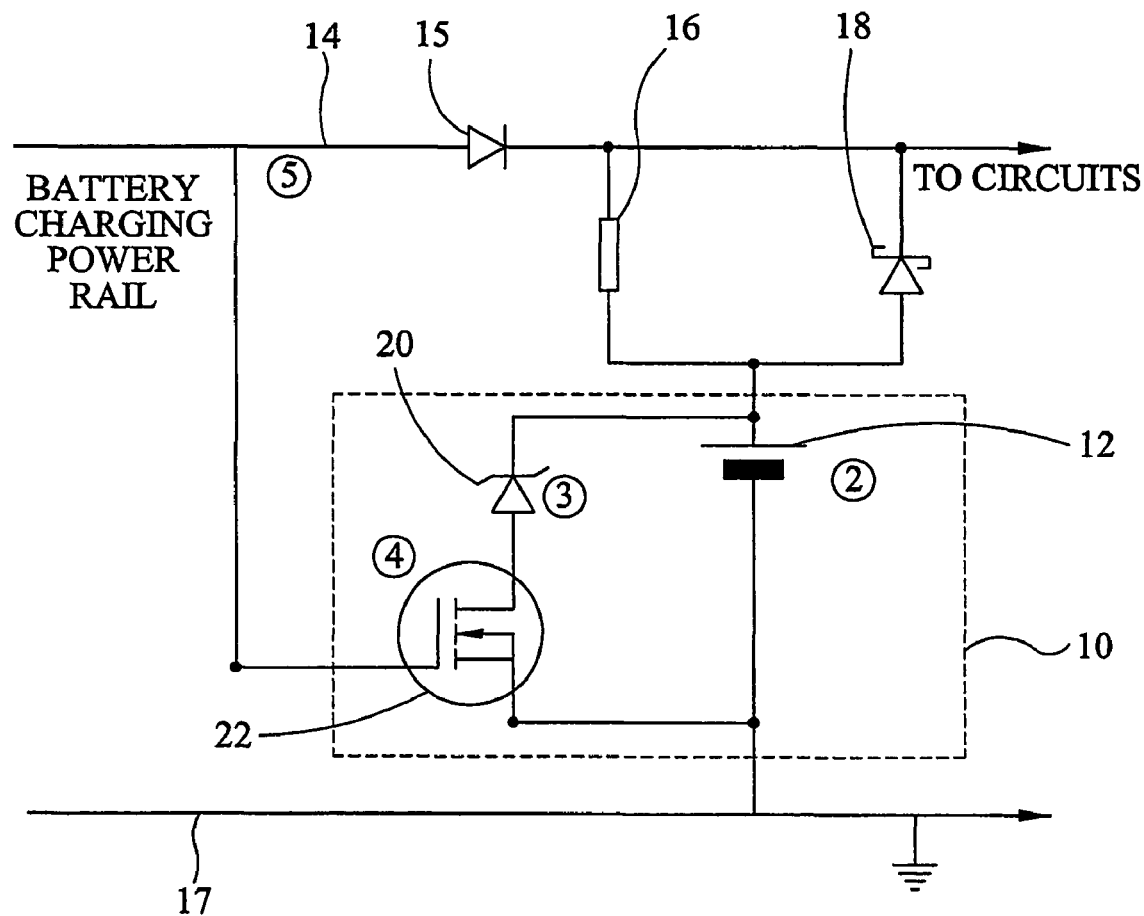
FIG. 1 is an electrical circuit diagram of a first form of power supply according to the invention.

Referring to FIG. 1, a preferred form of power supply according to the invention is shown generally at 10. The power supply 10 comprises a single battery or cell 12, the positive terminal of the cell 12 being connected to a power source or charging current source in the form of a power rail 14 via a diode 15 and a parallel combination of a resistor 16 and a Schottky diode 18. The negative terminal of the cell 12 is connected to the earth or zero volt rail 17 of the charging current source.

The cell 12 has a series combination of voltage protection means, in the form of a Zener diode 20, and disconnecting means, in the form of a field effect transistor (FET) 22 connected in parallel across the cell 12. The Zener diode 20 is connected across the cell 12 in a reverse biased direction, i.e. with its cathode connected to the positive terminal of the cell 12. The anode of the Zener diode 20 is connected to the drain electrode of the FET 22 whilst the source electrode of the FET 22 is connected to the negative terminal of the cell 12.

It will be appreciated that any electrically equivalent connection of the Zener diode and FET, for example with the anode of the Zener diode being connected to the negative terminal of the cell 12, the cathode of the Zener diode being connected to the source of the FET and the drain of the FET being connected to the positive terminal of the cell, will function equally well.

The gate electrode of the FET 22 is connected directly to the power rail 14 of the charging current source.

In operation, when a voltage is applied to the power rail 14 of the charging current source, thereby to charge the cell, current flows through the diode 15 and resistor 16 and through the cell 12 to earth. The purpose of the resistor 16 is to limit the current through the cell to a value appropriate for charging the cell. At the same time, the voltage on the power rail 14 is applied to the gate electrode of the FET 22 which is thereby switched on. This connects the Zener diode 20 across the cell 12.

As the cell 12 is charged, the voltage across the cell rises. If the voltage across the cell 12, and thus across the Zener diode 20, rises above the breakover voltage of the Zener diode 20, the Zener diode 20 will break down and begin to conduct leakage current therethrough The flow of leakage current through the Zener diode 20 prevents the voltage across the cell 12 from rising further and thus the voltage is effectively clamped at or around the breakover voltage of the Zener diode. It is normal, therefore, for the breakover voltage of the Zener diode to be chosen to correspond substantially to the maximum voltage rating of the cell. It will be appreciated, therefore, that the presence of the Zener diode prevents overcharging of the cell 12.

When the cell is sufficiently charged and the voltage on the power rail 14 from the charging current source is switched off, current flows from the charged cell 12 through the Schottky diode 18 to the power rail 14 and out to any connected electronic equipment or circuit. Current is prevented from returning to the charging current source by the diode 15. The Schottky diode 18 is included to provide a low impedance path between the cell 12 and the connected equipment or circuit However, it is not essential to the invention and its inclusion is entirely optional.

As described above, however, with the Zener diode 20 connected across the cell 12, leakage current will continue to flow through the Zener diode 20 thus gradually discharging the cell 12, possibly at a rate greater than that caused by the electronic equipment itself. To prevent this, therefore, when the voltage on the power rail 14 from the charge current source is switched off, the voltage applied to the gate electrode of the FET 22 is reduced to zero such that the FET 22 is switched off and presents an open circuit. The Zener diode 20 is therefore effectively disconnected from the cell 12 and thus no leakage current can flow therethrough. All current from the cell 12 is thus applied to the electronic equipment or circuit and any unwanted discharging to the Zener diode 20 is effectively eliminated.

Figure 2:
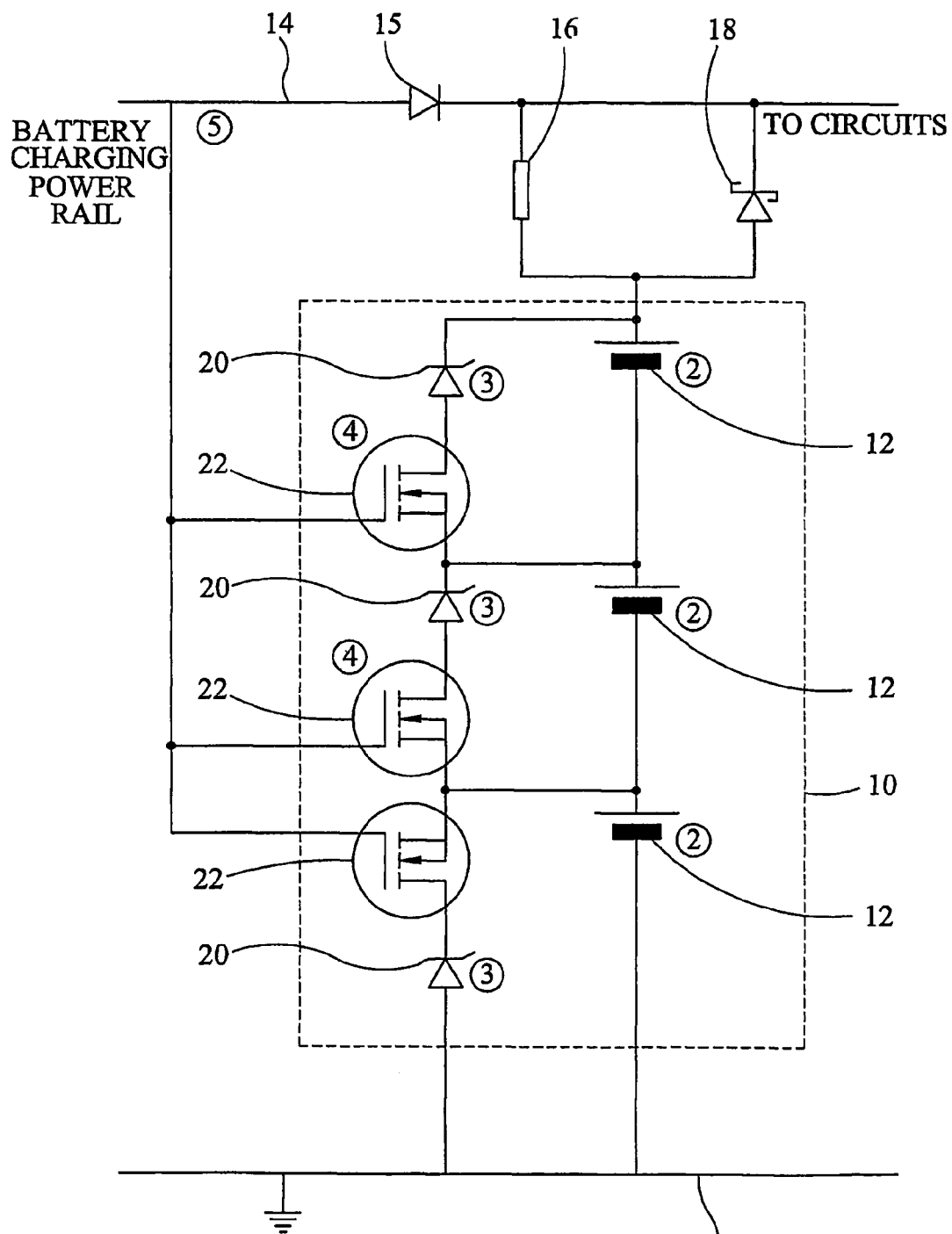
FIG. 2 is an electrical circuit diagram of a second form of power supply according to the invention.

FIG. 2 illustrates a similar arrangement but where the power supply comprises three, series-connected cells 12, hereafter termed collectively as the "battery". In this embodiment, each cell 12 in the battery has a Zener diode 20 connected in parallel with it and a FET 22 connected in series with the Zener diode. It is clear from the drawings that the arrangement within the dashed box 10 in FIG. 1 is repeated for each cell in the battery of FIG. 2.

In this embodiment, when the voltage across any one of the cells 12 in the battery exceeds the breakover voltage of the cell's respective Zener diode 20, leakage current will be passed through the Zener diode and prevent the voltage on the cell from rising further.

Figure 3:
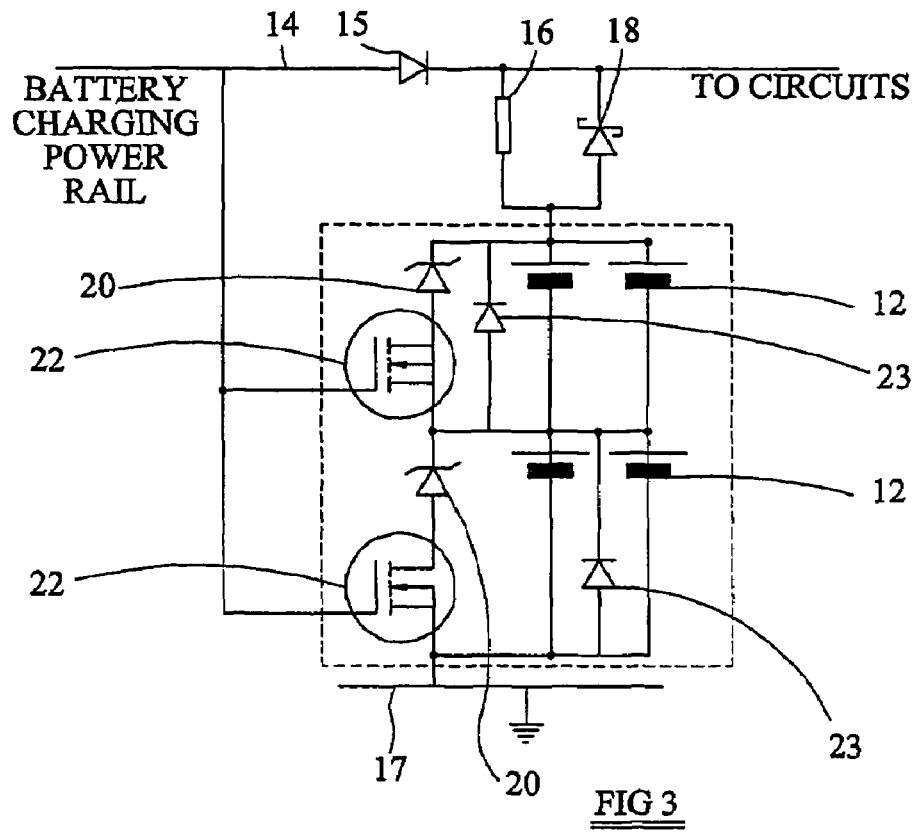
FIG. 3 is an electrical circuit diagram of a third form of power supply according to the invention.

In FIG. 3, the power supply is shown having a different arrangement of cells 12. In this case, the battery is comprised of 4 cells 12 in a two by two, series-parallel arrangement. Each pair of parallel connected cells 12 is provided with a respective Zener diode 20 and FET 22 connected in parallel over the cell pair.

The mode of operation of the embodiment of FIG. 3 is similar to that of FIGS. 1 and 2 in that if the voltage over any one of the cells 12 rises above the breakover voltage of the respective Zener diode 20, then leakage current through the Zener diode will prevent that voltage from rising any further.

Figure 4:
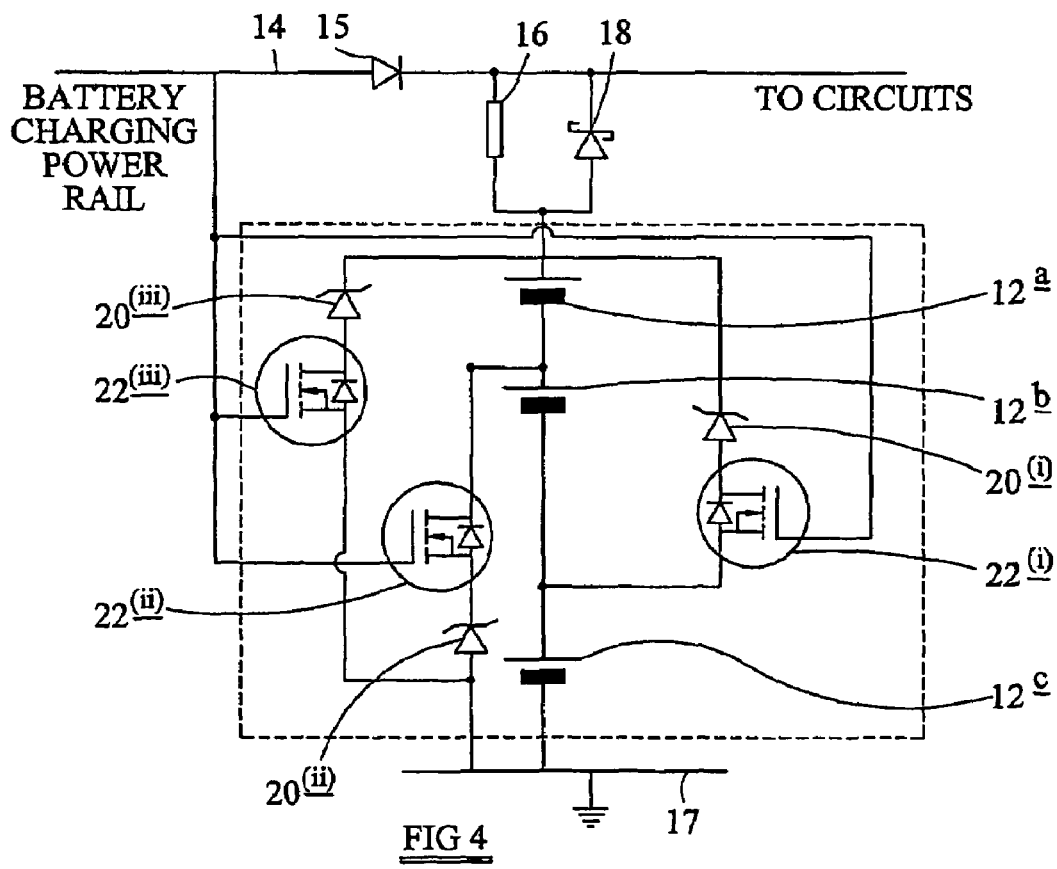
FIG. 4 is an electrical circuit diagram of a fourth form of power supply according to the invention

In FIG. 4, a stepped arrangement of voltage protection is provided. In this embodiment, the battery of the power supply comprises three cells 12a, 12b, 12c connected in series. The series combination of cells 12a and 12b has a first Zener diode 20(i) and FET 22(i) connected in parallel thereover. The series combination of cells 12b and 12c has a second Zener diode 20(ii) and FET 22(ii) connected in parallel thereover while the series combination of all three cells 12a, 12b, 12c have a third Zener diode 20(iii) and FET 22(iii) connected in parallel thereover.

As will be clearly understood by those skilled in the art, if the voltage over the series combination of cells 12a and 12b exceeds the breakover voltage of Zener diode 20(i), then leakage current through Zener diode 20(i) will prevent the voltage over the cells from rising any further. Similarly, if the voltage over cells 12b and 12c exceeds the breakover voltage of Zener diode 20(ii) then leakage current through Zener diode 20(ii) will prevent the voltage over cells 12b and 12c from increasing any further. Finally, if the combined voltage over all three cells exceeds the breakover voltage of Zener diode 20(iii) then this diode will break down and leakage current through Zener diode 20(iii) will prevent the voltage over cells 12a, 12b and 12c from increasing any further.

In all illustrated embodiments, the voltage protection provided by the Zener diodes 20 is only effective when the respective FET 22 connected to the Zener diode is switched on thereby to connect the Zener diode across the respective cell or cells. Each FET is switched on only when the power rail 14 of the charge current source is energised, for example when the cells 12 are being charged. When the power rail 14 is de-energised, each FET 22 will switch off thus disconnecting the respective Zener diode from the respective cell or cells 12, thus preventing any leakage current from passing through the Zener diode and thus avoiding any unwanted discharging of the cell or cells.

It will be appreciated that the present invention allows the safe charging of one or more rechargeable cells and avoids the disadvantageous effects of both overcharging of one or more of the cells and excessive discharging of the cells during normal operation.

It will also be appreciated, however, that a number of modifications may be made to the invention as desired. For example, the Zener diode 20 may be replaced by resistive devices or any other devices which permit a selected level of leakage current to pass therethrough. In addition, the FET's 22 could be replaced by any other form of electronic switches or by any other device which upon energising of the power rail 14, causes the voltage protection means to be connected across one or more of the cells. It is even envisaged that a mechanical arrangement, such as a manually operated switch, may be employed to selectively disconnect the Zener diodes or other voltage protection means from the cell or cells.

It will be clear that the invention is not limited to any particular kind of rechargeable cell which may be, for example, nickel-cadmium (Ni—Cd) "NICAD" cells, nickel metal hydride (NiMH) cells or any other chemical rechargeable cells or even solid cells (e.g. lithium polymer cells), capacitors or any other type of rechargeable device capable of storing and delivering electrical energy.

It is also possible for the invention easily to be configured for mechanical applications such as fuel cells for gas, liquid or other fuel or pressure containers. In this case the voltage protection means may be replaced by pressure release valves or other such devices.

In order to allow the power supply to operate in the event of an open circuit failure of one or more of the cells, conventional diodes may be permanently connected in parallel across each cell or cell pair to ensure a continuous path around the failed cell or cells. Having negligible reverse leakage current, these diodes will not discharge the power supply in any way. A possible arrangement for such diodes 23 is shown in FIG. 3 whilst in FIG. 4, each FET 22(i,ii,ii) is provided with an integral diode 24.

The invention claimed is:

1. A rechargeable power supply comprising:
   at least one rechargeable cell connectable to a power source having a power rail;
   voltage protection means connected across the at least one rechargeable cell in a reverse biased direction, the voltage protection means allowing leakage current to flow through the voltage protection means in a reverse direction; and
   voltage dependent disconnecting means operable to disconnect said voltage protection means from said at least one rechargeable cell when voltage on the power rail is switched off to reduce discharge of said at least one rechargeable cell by the leakage current through said voltage protection means.

2. The rechargeable power supply as claimed in claim 1, wherein said voltage protection means is a Zener diode.

3. The rechargeable power supply as claimed in claim 1, wherein said voltage dependent disconnecting means is a FET.

4. A rechargeable power supply comprising;
   at least one rechargeable cell connectable to a power source having a power rail;
   voltage protection means connected to the at least one rechargeable cell; and
   voltage dependent disconnecting means operable to disconnect said voltage protection means from said at least one rechargeable cell when voltage on the power rail is switched off to reduce any discharge of said at least one rechargeable cell through said voltage protection means,
   wherein said voltage protection means and said voltage dependent disconnecting means are connected together in series and jointly connected across said rechargeable cell in parallel.

5. The rechargeable power supply as claimed in claim 3, wherein a gate electrode of the PET is connectable to said power source thereby to actuate said voltage dependent disconnecting means.

6. The rechargeable power supply as claimed in claim 1, further comprising at least one diode connected in parallel with said at least one rechargeable cell.

7. The rechargeable power supply as claimed in claim 1, further comprising:
   additional rechargeable cells connected in series to the at least one rechargeable cell;
   additional voltage protection means connected across each of the additional rechargeable cells in a reverse biased direction,the additional voltage protection means allowing additional leakage current to flow through the additional voltage protection means in a reverse direction; and
   additional voltage dependent disconnecting means operable to disconnect said additional voltage protection means from said additional rechargeable cells when voltage on the power rail is switched off such that discharge of said additional rechargeable cells by the additional leakage current through said additional voltage protection means is reduced,
   wherein each additional voltage protection means is coupled in series to one of the additional voltage dependent disconnecting means forming a first series connection and the first series connection is connected in parallel across one of the additional rechargeable cells.

8. A method of protecting a rechargeable cell in a power supply, the power supply having a power rail, the method comprising:
   during recharging of said rechargeable cell, selectively connecting voltage protection means to said rechargeable cell for limiting a recharging voltage applied to said rechargeable cell; and
   after recharging of said rechargeable cell, selectively disconnecting said voltage protection means from said rechargeable cell when voltage on the power rail is switched off to reduce discharging of said rechargeable cell through said voltage protection means.

9. The rechargeable power supply as claimed in claim 1, further comprising at least one diode connected in parallel with said voltage dependent disconnecting means.

10. The rechargeable power supply as claimed in claim 1, further comprising;
    one or more additional rechargeable cells connected in parallel to the at least one rechargeable cell,
    wherein the at least one rechargeable cell, the one or more additional rechargeable cells, the voltage protection means and the voltage dependent disconnecting means together form a first battery unit.

11. The rechargeable power supply as claimed in claim 10, further comprising additional battery units coupled in series to the first battery unit.

12. The rechargeable power supply as claimed in claim 1, further comprising:
    additional rechargeable cells connected in series to the at least one rechargeable cell;
    additional voltage protection means coupled to a series connection of two or more of the at least one rechargeable cell and the additional rechargeable cells; and
    additional voltage dependent disconnecting means, each additional voltage dependent disconnecting means coupled in series with one of the additional voltage protection means to form a protection unit,
    wherein each voltage protection unit is coupled in parallel across two or more of the at least one rechargeable cell and the additional rechargeable cells.

13. The method as claimed in claim 8, wherein during recharging of said rechargeable cell, selectively connecting the voltage protection means to said rechargeable cell reduces or eliminates overcharging of said rechargeable cell.

14. The method as claimed in claim 8, wherein selectively disconnecting said voltage protection means from said rechargeable cell prevents discharging of said rechargeable cell through said voltage protection means.

15. A rechargeable power supply comprising:
    at least one rechargeable cell connectable to an applied voltage for recharging the at least one rechargeable cell;
    a voltage protection device coupled in parallel to the at least one at least one rechargeable cell, the voltage protection device capable of conducting current in a forward direction and being subject to breakdown at a predetermined voltage, wherein the breakdown allows the voltage protection device to conduct current in a reverse direction opposite the forward direction; and
    a switch coupled to the at least one rechargeable cell and coupled in series to the voltage protection device,
    wherein the switch is operable to disconnect the voltage protection device from the at least one rechargeable cell when the applied voltage is switched off to reduce discharge of the at least one rechargeable cell through the voltage protection device in the reverse direction during the breakdown.

* * * * *

UNITED STATES PATENT AND TRADEMARK OFFICE
CERTIFICATE OF CORRECTION

PATENT NO. : 7,262,581 B2  Page 1 of 1
APPLICATION NO. : 10/476963
DATED : August 28, 2007
INVENTOR(S) : Nicholas Alexander Rutter It is certified that error appears in the above-identified patent and that said Letters Patent is hereby corrected as shown below:

In the Claims

Column 5, line 40, Claim 5          Delete "PET",
                                     Insert --FET--

Column 5, line 52, Claim 7          Delete "direction,the",
                                     Insert --direction, the--

Column 6, line 53, Claim 15         Delete "at least one at least one",
                                     Insert --at least one--

Signed and Sealed this

Thirtieth Day of September, 2008

JON W. DUDAS
*Director of the United States Patent and Trademark Office*